S. Males,
Cider Mill.
Nº 16,847.  Patented Mar. 17, 1857.
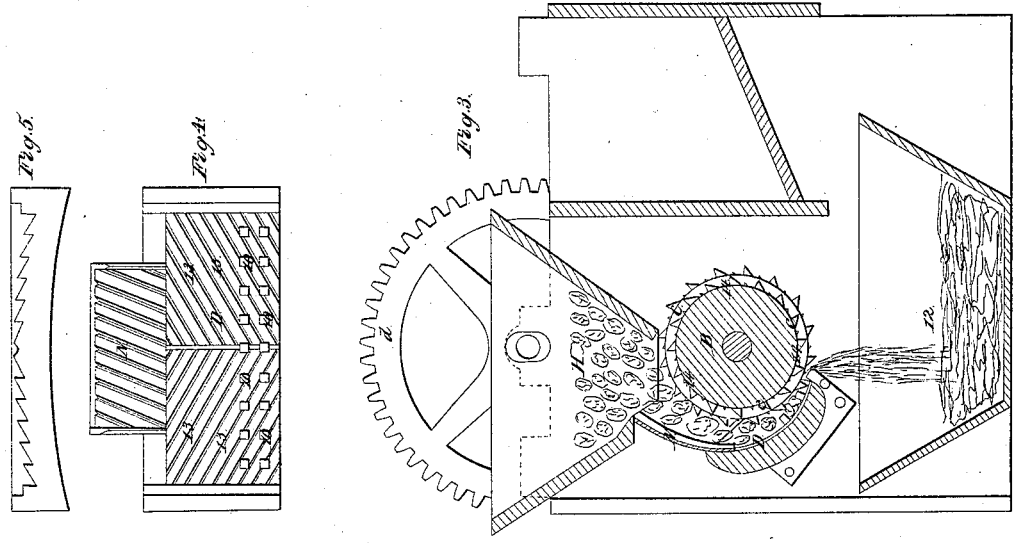
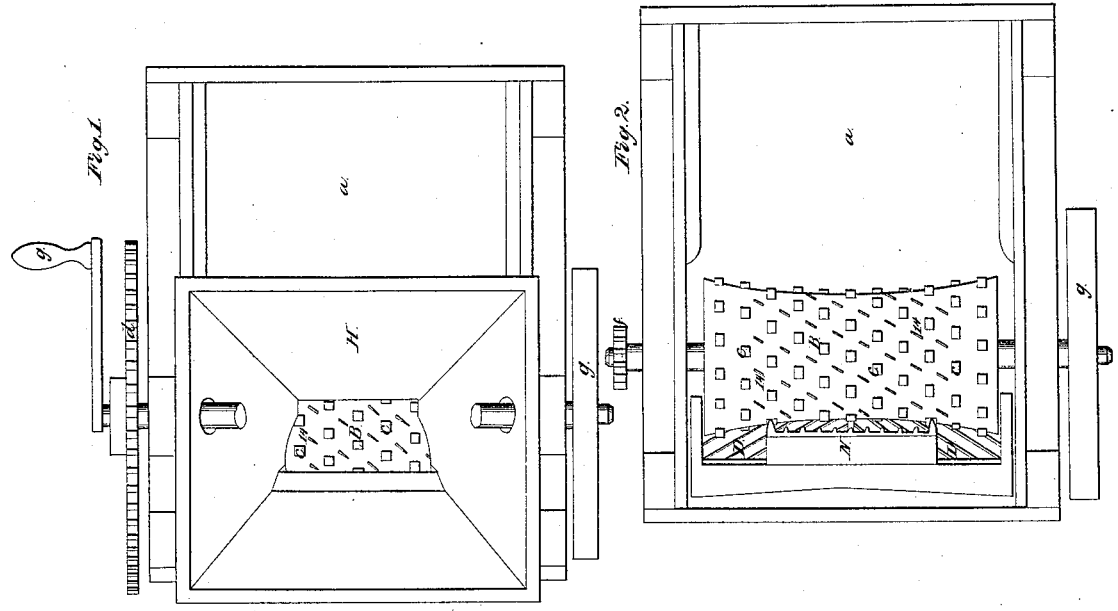

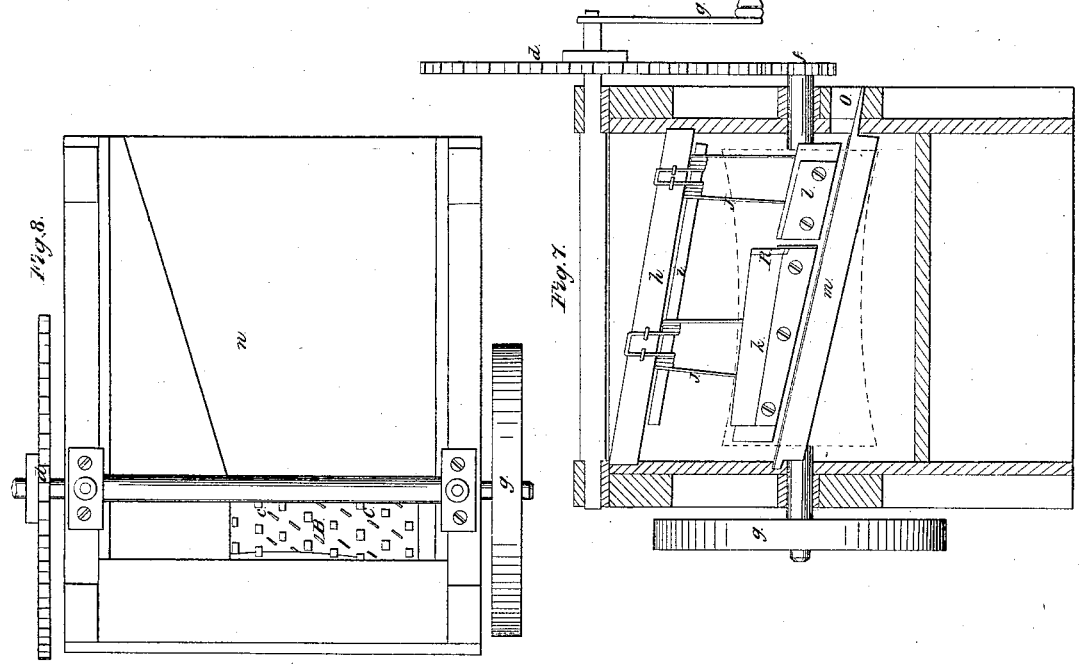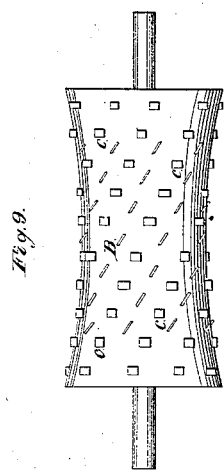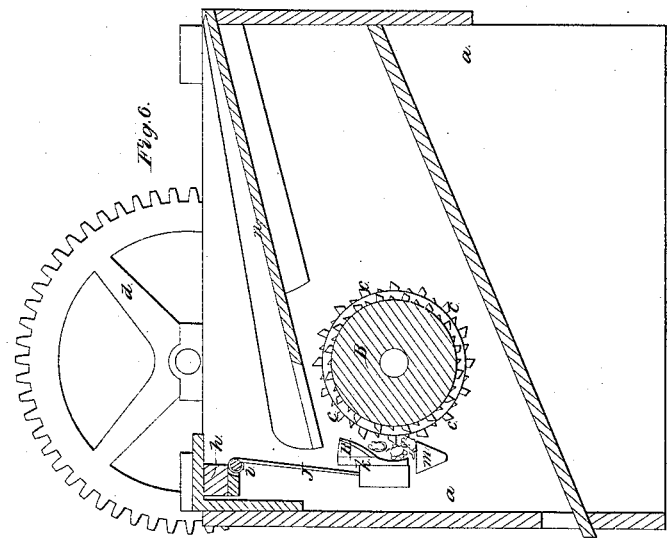

UNITED STATES PATENT OFFICE.

SAMUEL MALES, OF CINCINNATI, OHIO.

CONVERTIBLE CIDER-MILL.

Specification of Letters Patent No. 16,847, dated March 17, 1857.

*To all whom it may concern:*

Be it known that I, SAMUEL MALES, of Cincinnati, Hamilton county, Ohio, have invented a new and useful Convertible Cider-Mill and Corn-Sheller; and I hereby declare the following to be a full and exact description thereof, reference being had to the accompanying drawings, making part of this specification.

The object of my invention is to produce a machine with the cylinder, concaves and other parts of such construction as to make it readily convertible from a cider mill to a corn sheller and vice versa.

In the accompanying drawings, Figures 1, 2, 3, 4 and 5 represent my machine as employed for grinding apples, other fruit, or vegetables;—Fig. 1 being a top view of the machine, Fig. 2 a top view with the hopper removed, Fig. 3 a transverse section of the mill complete, Fig. 4 a face view of the concave and Fig. 5 a section of the same. Figs. 6, 7, 8 and 9 represent the machine as converted into a corn sheller, Fig. 6 being a section of the machine, transversely of the "cylinder", Fig. 7 a longitudinal section exhibiting the manner of attachment of the concave and crossbeam, Fig. 8 a top view of the machine and Fig. 9 a view of the "cylinder" detached.

I will first describe the arrangement and operation of my machine as employed for the grinding of apples, grapes, vegetables &c.

(A) is the frame of the machine. (B) is a rotating "cylinder" smaller in the center than at the ends and armed with teeth (C) arranged around the "cylinder" in rows parallel with its rotation and furnished also between the rows with smaller teeth or short longitudinal ribs (14). (D), the concave is of form to suit the shape of the cylinder and is provided over its whole surface with oblique ribs (N, 13) (Fig. 4) and two or more rows of teeth (11) near its lower edge. The upper series of ribs (N) being of such form as to prevent the apples from rolling or slipping or cause them to be immediately crushed on falling between the "cylinder" and "concave", and the lower ribs (13) converging in the center as represented have a tendency to divert the fruit from the ends of the "cylinder." The teeth (11) are so arranged that the large teeth (C) on the "cylinder" pass between them, while the small teeth or ribs (14) pass over and nearly in contact with the teeth (11) of the "concave" thoroughly grinding anything subjected to their action.

(H) is the hopper as employed for grinding fruit and vegetables. A sliding board (*o*) may be used in connection with the cider mill to prevent the wasting of the fruit by the centrifugal action of the "cylinder".

The frame (A) "cylinder" (B) cog wheel (*d*) fly wheel (*d'*) pinion (*f*) and crank (*g*) are the same in both uses of the machine.

The conversion of the machine into a corn sheller is performed as follows. The shaft to which the crank (*g'*) is attached is first drawn out to admit of the removal of the hopper and the hopper and concave are then removed, a cross beam (*m*) and new concave (*k, l,*) inserted and the shaft replaced. The concave (*k, l,*) is in two parts and attached to the bar (*h*) by separate springs (J) which are coiled around the rod (*i*) to increase their elasticity.

(R) is a projection from the upper edge of the part (*k*) of the concave, serving to prevent the ear of corn rising up from the action of the cylinder. The part (*l*) fits more closely to the cylinder than (*k*) thus serving thoroughly to shell such ears as may partially escape from the first plate. The ear of corn gradually advances along the inclined beam (*m*) until the grain being all removed the cob escapes from the machine. An improved spring may be applied to the concave (*k, l,*) in form like the spring of a gun-lock, &c., the arms being constructed of wood and tenoned into an iron bar at their intersection. The concave is attached to one arm and a wedge shaped block fitting between the other arm and the back of the mill renders the spring adjustable in tension. (*n*) is the hopper employed in the corn sheller. The concave which is not in use may be compactly stowed away in the interior of the mill.

The described form of "cylinder" is considered to be most effective but the sides may be straight if preferred without varying the principle of the invention.

Having minutely described the construction of my machine as employed for its various purposes, I do not claim as new any improvements in the separate machines but

What I claim as new and of my invention herein is:—

Rendering the machine readily convertible from a cider mill to a corn sheller and vice versa by making the concaves (D) (k, l,) hoppers (H) (n) and cross beam (m) in the described form, the cylinder and driving gear being the same in both cases, as set forth.

SAMUEL MALES.

Witnesses:
MARTIN BENSON,
J. P. DAVIS.